United States Patent [19]

Dries

[11] Patent Number: 4,695,298
[45] Date of Patent: Sep. 22, 1987

[54] APPARATUS FOR CLEANING SOLIDS-LADEN GAS

[75] Inventor: Hubertus W. A. A. Dries, Amsterdam, Netherlands

[73] Assignee: Shell Oil Company, Houston, Tex.

[21] Appl. No.: 547,690

[22] Filed: Nov. 1, 1983

[30] Foreign Application Priority Data

Nov. 1, 1982 [GB] United Kingdom ............... 8231168

[51] Int. Cl.[4] .................. B01D 47/06; B01D 47/10; B01D 47/12
[52] U.S. Cl. .......................... 55/223; 55/89; 55/92; 55/94; 55/238; 261/22; 261/79.2
[58] Field of Search ............... 55/89, 92–94, 55/223, 226, 229, 238, 241; 261/22, 79 A, DIG. 54

[56] References Cited

U.S. PATENT DOCUMENTS

| | | | |
|---|---|---|---|
| 1,979,189 | 10/1934 | Bowers | 55/89 |
| 3,142,548 | 7/1964 | Krantz | 261/118 |
| 3,793,809 | 2/1974 | Tomany et al. | 55/93 |
| 3,834,127 | 9/1974 | Jordan et al. | 55/226 |
| 3,884,653 | 5/1975 | Capulli et al. | 55/223 |
| 4,133,655 | 1/1979 | De Cardenas | 55/223 |
| 4,356,009 | 10/1982 | Calvert | 55/93 |
| 4,469,493 | 9/1984 | Tuovinen et al. | 55/89 |

FOREIGN PATENT DOCUMENTS

| | | | |
|---|---|---|---|
| 197095 | 7/1965 | Sweden | 261/DIG. 54 |
| 519210 | 7/1976 | U.S.S.R. | 55/94 |
| 578093 | 10/1977 | U.S.S.R. | 55/238 |

Primary Examiner—David L. Lacey

[57] ABSTRACT

A solids-laden gas is cleaned by introducing a condensing fluid in the gas to saturate the gas and allowing liquid to condense on the solids to form enlarged particles. Liquid separated from the gas with enlarged particles is then atomized in the gas to form agglomerates of liquid and enlarged particles, whereafter the formed agglomerates are separated from the gas. An apparatus for carrying out this process is also described, the apparatus being characterized by a first stage in which means are provided for enlarging solids in a solids-laden gas flow by contact with a condensing fluid, separation of liquid from the gas flow, and a second stage in which means are provided for introducing the separated liquid into the gas flow in a venturi-shaped gas passage member.

2 Claims, 1 Drawing Figure

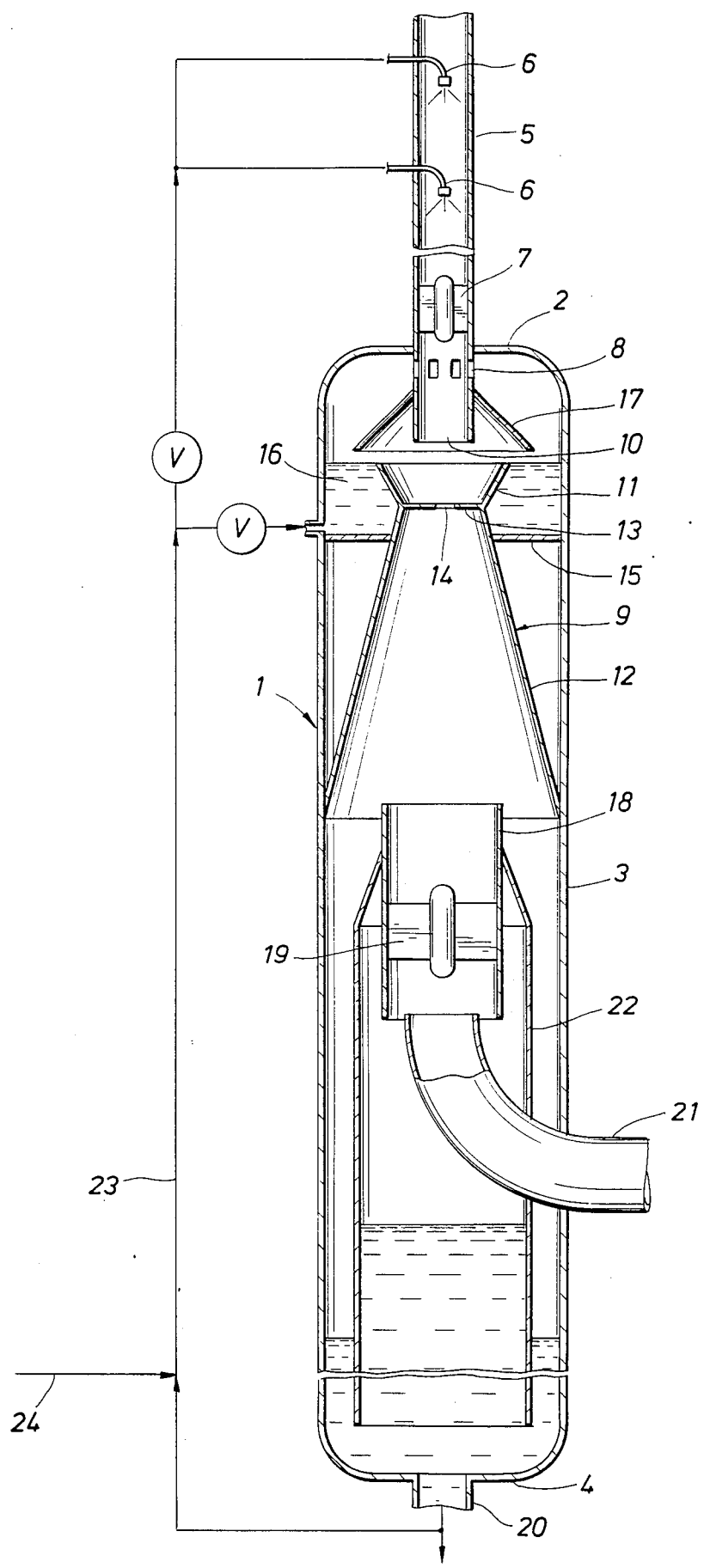

APPARATUS FOR CLEANING SOLIDS-LADEN GAS

BACKGROUND OF THE INVENTION

The invention relates to a process for cleaning solids-laden gas, and to an apparatus for carrying out such a process.

A great variety of processes and devices are known for removing solid contamination from gases such as flue gases and product gases. Especially in industrialized and heavily crowded areas, flue gases must be cleaned thoroughly prior to emission into the atmosphere in order to minimize environmental pollution. One example of cleaning product gases can be found in the purification of crude synthesis gas prior to further processing or use of the gas. Such a purification is required in order to prevent fouling of the equipment used for further processing or application of the gas.

The various types of gas cleaning devices available at present can be divided into two groups, viz. the so-called dry cleaning devices and the so-called wet cleaning devices. Dry cleaning devices, such as filters and cyclones, are suitable for removing relatively coarse solids from gases. If very small solid contaminations, having sizes less than about 5 microns, are to be removed, filters might be effective. However, such filters have the drawback that their size is normally rather large. In order to increase the separation efficiency or to obtain a more compact unit, use can be made of devices of the wet cleaning type. In these latter devices, the solid contaminations of a gas stream are caught and entrained by a washing liquid which is atomized in the gas stream.

An apparatus for wet cleaning of solids-laden gas is known from U.S. Pat. No. 3,142,548. In this patent, a so-called venturi scrubber is disclosed, wherein during operation a solids-laden gas is caused to flow through a venturi-shaped device. Upon passing the throat of said device, the gas stream with the very fine dispersed solids is considerably accelerated, while simultaneously, washing liquid is added to the gas stream at a rather low velocity. The washing liquid is dispersed in a fog-like fashion in the gas. The large relative solids/droplets velocity will result in the formation of agglomerates of solid contaminations and washing liquid droplets due to inertial impaction. These agglomerates are subsequently removed from the gas with the aid of mechanical separation means, formed by a filter mat in the above known cleaning apparatus.

The above known wet-cleaning device has a high separation efficiency for fine solids. However, very fine solids, on the order of magnitude of less than 1 micron, tend to remain in the gas stream when using this known wet-cleaning device, unless very high pressure losses for the gas phase are permitted in the venturi-throat.

The ever-increasing production of flue gases and product gases, nonetheless, requires more advanced separating procedures and equipment of this kind, having very high separation efficiency, even for the very fine particles, but at an acceptable pressure drop for the gas phase. An object of the present invention, therefore, is to provide a process for cleaning solids-laden gases which has a higher separation efficiency than the known separating methods, without, however, reducing the throughput and considerably increasing the gas phase pressure drop.

SUMMARY OF THE INVENTION

Accordingly, the invention relates to a process for cleaning a solids-laden gas comprising
  (a) introducing a fluid into a solids-laden gas flow, saturating the gas, and allowing fluid to condense on to the solids in the gas flow, and forming enlarged particles and liquid;
  (b) separating at least part of the formed liquid from the gas flow with the enlarged particles;
  (c) atomizing separated liquid in the gas flow with enlarged particles, and forming agglomerates of liquid and enlarged particles; and
  (d) separating the formed agglomerates of liquid and enlarged particles from the gas, and recovering substantially solids-free gas.

As will be observed, in the process of the invention, the separation step is preceded by a conditioning step, in which the solid particles are covered with liquid, thereby forming enlarged relatively coarse particles, which can be relatively easily separated from the gas.

A further object of the invention is to provide an apparatus for use in the above inventive process. Accordingly, the invention relates to an apparatus for cleaning solids-laden gas, the apparatus comprising a vertically extending vessel with a solids-laden gas supply conduit communicating with and substantially vertically extending into the top part of the vessel. The supply conduit is provided with means for introducing a fluid therein, first means for imparting a rotary motion to a gas/liquid mixture to separate liquid from gas, and means for laterally discharging separated liquid from the supply conduit into the vessel. The vessel is provided internally with a venturi-shaped gas passage member communicating with and substantially coaxially aligned with respect to the supply conduit, and means substantially surrounding at least the upper part of the venturi-shaped gas passage member and forming therewith and the walls of the vessel means for liquid collection. The apparatus further comprises means for guiding liquid from the means for laterally discharging separated liquid into the means for liquid collection and means for guiding liquid from the means for liquid collection into the throat of the venturi shaped gas passage member at or above the throat thereof, second means for imparting a rotary motion to a gas/liquid mixture aligned with and communicating with the discharge end of said venturi shaped passage member in said vessel to separate liquid with solids from gas, and separate means for discharging gas, and liquid with solids, from the vessel.

The invention will now be described by way illustration with reference to the accompanying drawing, which shows schematically a longitudinal section of an apparatus for cleaning solids-laden gas.

The dedusting apparatus shown, which is of the so-called wet-cleaning type, comprises a vertically extending substantially cylindrical vessel (1), having a topwall (2), a sidewall (3) and a bottomwall (4). A supply conduit (5) for solids-laden gas extends substantially vertically through an opening in the topwall (2). The interior of the conduit (5) is provided with a number of atomization nozzles (6) vertically spaced apart from one another. At some distance below the nozzles (6), a vane assembly (7) is arranged which consists of a plurality of fixedly mounted inclined vanes, (not separately indicated in the drawing). Such a vane assembly is also indicated by the term "swirler". Downstream of the vane assembly (7), the wall of supply conduit (5) is provided with a plurality of liquid discharge openings (8) for withdrawing separated liquid from the conduit (5) into the space enveloped by the vessel sidewall (3). Supply conduit (5) is at its lower part mechanically connected to wall (3), for example via baffle (17), described below.

Inside the vessel a venturi shaped member or device (9) is substantially coaxially arranged with respect to the open lower end (10) of supply conduit (5). The venturi shaped device (9) is formed by a downwardly converging frusto-conical upper part (11), and a downwardly diverging frusto-conical lower part (12) having its top connected to the upper part (11), and being at its base supported by the vessel sidewall (3). The throat of the venturi-shaped device (9), i.e., the narrowest part thereof, is provided with a substantially horizontal wall (13) with a central opening (14) which forms a constriction for fluid passing through the device. A substantially horizontal wall (15) extends between the outer surface of venturi (9) and the vessel sidewall (3) thereby forming a liquid collecting space, indicated in the drawing with reference numeral (16). In order to prevent direct entry of liquid, separated in swirler (7), from the supply conduit (5) into the venturi shaped device (9), a downwardly sloping guiding baffle (17) is mounted on to the outer surface of the lower part of supply conduit (5).

The vessel (1) is further provided with an open-ended tubular element (18) which is substantially coaxially arranged with respect to the venturi shaped device (9). The tubular element (18) is provided with a vane assembly (19) consisting of a plurality of fixedly mounted inclined vanes (not separately indicated in the drawing). Liquid is withdrawn from the vessel (1) via liquid outlet (20) arranged in an opening in the vessel-bottomwall (4), while purified gas is discharged via a clean gas outlet (21), passing through an opening in the vessel sidewall (3) and having its upstream end arranged in close proximity to and aligned with the open-ended tubular element (18). In order to obviate pressure turbulences in the bottom part of vessel (1), an enveloping wall (22) is arranged between open-ended tubular element (18) and vessel sidewall (3), wherein the lower end of said wall (22) is arranged in relatively close proximity to the vessel bottom wall (4), thereby forming a liquid seal in the bottom of the vessel during operation.

The apparatus shown in the drawing is further provided with a recirculation system, schematically shown and indicated by reference numeral (23), for recycling liquid from the bottom part of the vessel (1) to the atomization nozzles (6) and to the liquid collecting space (16). Fresh liquid can be supplied to the apparatus shown via line (24). It should be noted that the pumping means for the recycle system and the fresh liquid supply system are known per se and have not been indicated in the drawing.

The operation of the wet-dedusting apparatus shown in the drawing is as follows. Gas pretreated, in, for example, a cyclone for removing the relatively coarse solid contaminations therefrom, is passed through the apparatus shown for removing the very fine solid contaminations remaining in the gas. The gas is caused to flow through gas supply conduit (5), while cooling liquid is introduced into the gas stream by the atomization nozzles (6). The liquid, which is maintained at a lower temperature than the gas, evaporates upon contact of the gas, causing a cooling down of the gas. Upon further introduction of relatively cool liquid, the evaporated liquid will condense on the fine solids in the gas stream, in which manner relatively coarse particles are formed consisting of nuclei of solid contaminations surrounded by a layer of liquid. Upon passing the vane assembly (7) a swirling motion is imparted to the gas/liquid/solids mixture causing impingement and coalescence of the larger liquid droplets and part of the wetted solids on the inner surface of conduit (5). The so-formed liquid film flows downwardly and will leave conduit (5) via the liquid discharge openings (8), whereafter the liquid is guided along the vessel walls (2) and (3) and guiding baffle (17) into the liquid collecting space (16). The gas, with the smaller wetted particles, continues its path in downward direction and leaves the conduit (5) via the open lower end (10) thereof.

The main gas flow subsequently enters the downwardly converging upper part (11) of venturi shaped device (9), while liquid from collecting space (16) is caused to flow by way of gravity over the weir formed by the upper part (11) into venturi (9). The liquid flows along the inner surface of the converging part of the venturi (9) towards the horizontal wall (13), in the throat of the venturi. Upon arrival at the horizontal wall (13), the liquid's vertical velocity component is substantially zero. Upon passing the throat of the venturi, the gas stream with the wetted solids therein is considerably accelerated, while the liquid enters the gas stream at a rather low velocity. The liquid is dispersed in a fog-like fashion in the gas. The large relative gas/liquid velocity will result in the formation of agglomerates of wetted solids from the gas stream with liquid droplets due to inertial impaction. Since the contact area of the solids has been increased in the first phase of the process by surrounding the solid particles with a layer of liquid, even very small solid contaminations can be caught by the liquid at a rather moderate gas velocity over the venturi throat.

The gas/liquid and solid mixture entering the diverging part (12) via opening (14) in the venturi throat is subsequently separated in the lower part of vessel (1). Some of the liquid with captured solids is collected in the space between vessel-wall (3) and enveloping wall (22). The remaining part of liquid with captured solids passes with the continuous gas phase flow through the open-ended tubular element (18). Swirler (19) in the tubular element (18) imparts a swirling motion to the liquid/gas mixture, causing impingement and coalescence of the liquid with captured solids on the surface of tubular element (18). The liquid/solids film so formed flows downward along the surface and is subsequently collected in the bottom part of the vessel. Liquid with captured solids is withdrawn from the vessel (1) through liquid outlet (20). Care must be taken that the lower end of enveloping wall (22) is immersed in the liquid to prevent bypass of gas via the annular space between vessel wall (3) and enveloping wall (22). The enveloping wall (22) further prevents turbulence in the lower part of the vessel caused by pressure differences due to the pressure drop over the vane assembly (19). Gas, being substantially freed from liquid and solids, is withdrawn from the vessel (1) via gas outlet tube (21), the tube passing through an opening in the vessel sidewall (3) and having its upstream end arranged substantially coaxially with respect to the open ended tubular element (18).

Liquid with captured solids withdrawn from vessel (1) via the liquid outlet (20) is preferably partially recirculated to the atomizing nozzles (6) for further treatment of contaminated gas. Part of the recirculated liquid can be used for maintaining a proper liquid level in the liquid collecting space (16) to ensure continuous outflow of the liquid from said space into the venturi shaped device (9). Fresh liquid can be supplied to the system via line (24). In the above described embodiment of the invention, the gas to be treated is first contacted with a cooling liquid which is atomized in the gas, caused to evaporate, and consequently allowed to condense on to the solids in the gas to form enlarged particles which can be easily removed from the gas in a following stage of the process.

Instead of cooling liquid, any other condensing fluid can be applied, such as wet steam. When vaporous matter is used, it will be evident that the application of an atomizing system is superfluous. It should be noted that the gas supply conduit (5), extending substantially above the vessel (1) in the shown embodiment, may be substantially arranged in the vessel (1) itself. Instead of the arrangement of outlets shown in the drawing, the gas outlet may be arranged passing through the bottomwall (4) while the liquid outlet passes through the vessel sidewall (3).

What is claimed is:

2. The apparatus of claim 2 in which the means for guiding liquid from the means for lateral discharge of separated liquid is formed by a substantially downwardly sloping guiding baffle connected to the gas supply conduit.

1. An apparatus for cleaning a solids-laden gas comprising a vertically-extending vessel with a solids-laden gas supply conduit communicating therewith and substantially vertically-extending into the top-portion of the vessel, said supply conduit being provided with means for introducing a fluid therein; first means in said supply conduit for imparting a rotary motion to a gas/-liquid mixture in said conduit to separate liquid from gas; means for laterally discharging separated liquid from the supply conduit into the vessel; said vessel also being internally provided with a venturi-shaped gas passage member communicating at its entrance with and substantially coaxially aligned with the supply conduit; means for guiding liquid, from said means for lateral discharge of separated liquid, into a means for liquid collection; means substantially surrounding at least the upper part of the venturi-shaped gas passage member forming therewith and with the walls of the vessel said means for liquid collection, and further forming with said gas passage member means for guiding liquid from said means for liquid collection into the throat of the venturi-shaped gas passage member at or above the throat thereof; second means for imparting a rotary motion to a gas/liquid mixture to separate liquid with solids from gas, said second means being aligned with and communicating with the discharge end of said venturi-shaped passage member in said vessel; means for discharging liquid with solids from said vessel; and means for discharging gas from the vessel.

* * * * *